UNITED STATES PATENT OFFICE.

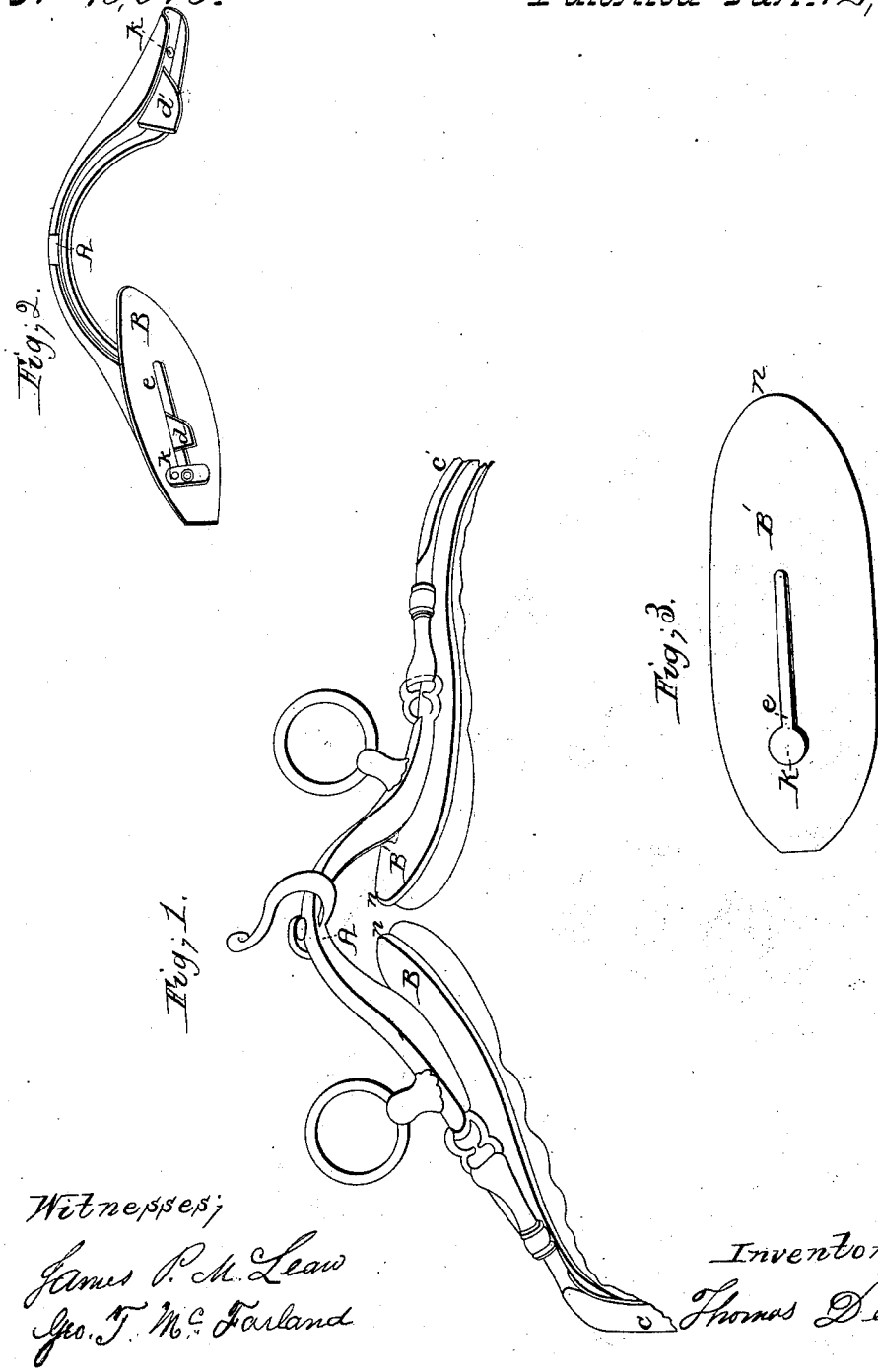

THOMAS DEMPSEY, OF NEWARK, NEW JERSEY.

HARNESS-TREE.

Specification of Letters Patent No. 19,078, dated January 12, 1858.

*To all whom it may concern:*

Be it known that I, THOMAS DEMPSEY, of Newark city, in the county of Essex and State of New Jersey, have made certain novel and useful Improvements in the Construction of Harness-Trees, such as Used in Light Carriages and Coaches; and I hereby declare the following to be a full, clear, and exact description thereof, reference being had to the accompanying drawings, which are lettered to correspond with and constitute a part of the specification.

I wish the public to understand that my invention is entirely adapted to light carriages or coach harness trees and not to saddles of any kind, and in order that those skilled in the art or manufacture of harness may fully understand the nature of my improvements I will describe them as follows.

Plate 1, represents a light carriage harness tree, having my improvements attached which consists in forming a metallic tree (A,) in such a manner that the center or top is raised one inch and a half more or less, from the top of the horse's back, in order to allow sufficient room for the spring pads (B, B',) to move up or down when the pads are operated by the back of the animal, and not the sides; as the springs in the pads (B, B',) can be operated only by a direct vertical pressure, and thus any strain or sudden jar coming upon the tugs (c c') operates the spring (B, B') and thereby relieves the horse.

Plate 2 shows the metallic tree (A) and the spring of the pad (B) the other spring being removed in order to show the tongue (d',) more fully; the tongues (d, d',) are cast upon the tree (A,) and constitute a part of the same, and serve to prevent the pads from getting out of place yet leaves them (the pads) perfectly free to move up or down by means of the slits or openings (e,) more fully shown at Plate (3,) which is an enlarged drawing of the flat pad-spring (B'.) These flat plates or springs are tempered from the terret nut (k,) to the points (n) only.

The terret nut (k,) being attached to the flat pad spring as shown at Plate (2,) the spring is secured by the terret to the tree (A) in such a manner that the tongue (d,) cannot get out of the slit (e) until the terret is unscrewed however flexible the springs may be. My arrangement of the pad springs (B, B',) secured by means of the combination of the terrets and tongues (d and d',) and those tongues being a part of the metallic tree (A) and placed in such a manner that the pad plates can only move up or down when pressed by the back bone of the horse I believe to be novel and useful.

I am aware of the application of springs of various kinds having been applied to riding saddles and harness saddles, and that pads have been made upon plates that were hinged to the terret nut and other parts of the tree and that these plates have been held to their places by means of the terret and nut; spiral springs have been used between the pad-plate and nut, for the purpose of easing the horse. I disclaim either of the above applications, neither do I claim to be the inventor of the individual parts of the above described harness tree; but

What I claim as new and useful and wish to secure by Letters Patent of the United States, is—

The plates (B, B') tongues (d, and d') in combination with the nuts (k) and tree (A,) in such a manner that I relieve the horse's back and not his side by means substantially as described and shown in the drawings.

In testimony whereof I hereunto subscribe my name in the presence of two witnesses.

THOMAS DEMPSEY.

Witnesses:
   JAMES P. McLEAN,
   G. T. McFARLAND.